US012570416B2

(12) United States Patent
Severns

(10) Patent No.: US 12,570,416 B2
(45) Date of Patent: Mar. 10, 2026

(54) QUICK RELEASE HUB OF A PROPULSION MECHANISM

(71) Applicant: Skydio, Inc., San Mateo, CA (US)

(72) Inventor: Donald Allen Severns, San Mateo, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 18/775,209

(22) Filed: Jul. 17, 2024

(65) Prior Publication Data

US 2025/0026507 A1     Jan. 23, 2025

Related U.S. Application Data

(60) Provisional application No. 63/527,267, filed on Jul. 17, 2023.

(51) Int. Cl.
*B64U 50/13*          (2023.01)
*B64C 11/04*          (2006.01)
*B64U 70/90*          (2023.01)

(52) U.S. Cl.
CPC .............. *B64U 50/13* (2023.01); *B64C 11/04* (2013.01); *B64U 70/90* (2023.01)

(58) Field of Classification Search
CPC .......... B64C 11/04; B64C 11/08; B64U 50/13
See application file for complete search history.

(56) References Cited

U.S. PATENT DOCUMENTS

| | | | | | |
|---|---|---|---|---|---|
| 1,539,273 | A | * | 5/1925 | Reed ...................... | B64C 11/04 |
| | | | | | 416/214 R |
| 4,477,228 | A | * | 10/1984 | Duffy .................... | B63H 23/34 |
| | | | | | 416/223 R |
| 9,057,273 | B2 | * | 6/2015 | Wang ...................... | B64C 27/32 |
| 2019/0039719 | A1 | * | 2/2019 | Baek ...................... | B64U 30/20 |
| 2021/0024204 | A1 | * | 1/2021 | Chen ...................... | B64U 50/19 |

FOREIGN PATENT DOCUMENTS

| | | | | | | |
|---|---|---|---|---|---|---|
| CN | | 106864732 | A | * | 6/2017 | ............. B64C 11/04 |
| CN | | 107264784 | B | * | 4/2022 | ............. B64U 10/14 |

* cited by examiner

*Primary Examiner* — Courtney D Heinle
*Assistant Examiner* — Ryan C Clark
(74) *Attorney, Agent, or Firm* — Young Basile Hanlon & MacFarlane, P.C.

(57)                ABSTRACT

A propulsion mechanism for an unmanned aerial vehicle (UAV) is disclosed. The propulsion mechanism includes one or more blades configured for rotation by a motor and a hub configured for coupling to the motor. The hub includes a spring plate assembly. The spring plate assembly includes a hub plate that includes a mating portion, a pressure plate that includes a keyhole that receives the mating portion of the hub plate to couple the hub plate to the pressure plate, and a biasing member configured to be disposed along a shaft of the motor between the motor and the pressure plate. The one or more blades are coupled to the hub between the hub plate and the pressure plate. Additionally, the biasing member is configured to increase friction between the one or more blades and hub plate.

20 Claims, 14 Drawing Sheets

QUICK RELEASE HUB OF A PROPULSION MECHANISM

CROSS-REFERENCE TO RELATED APPLICATION(S)

This application claims the benefit of U.S. Provisional Patent Application No. 63/527,267, filed Jul. 17, 2023, the contents of which are incorporated herein by reference in their entirety.

TECHNICAL FIELD

This disclosure relates to a propulsion mechanism for an unmanned aerial vehicle (UAV), and more specifically, to a hub of a propulsion mechanism for a UAV.

BACKGROUND

Propulsion mechanisms for UAVs often include one or more propeller blades coupled to a motor. Conventional propulsion mechanisms for UAVs are often large, mechanically complex, expensive, or a combination thereof. Additionally, conventional propulsion mechanisms for UAVs are often assembled in a manner that results in propeller blades connected to the propulsion mechanisms becoming loose during operation, thereby negatively impacting flight of the UAVs.

SUMMARY

In one aspect of the present disclosure, a propulsion mechanism for an unmanned aerial vehicle (UAV) is disclosed. The propulsion mechanism includes one or more blades configured for rotation by a motor and a hub configured for coupling to the motor. The hub includes a spring plate assembly. The spring plate assembly includes a hub plate that includes a mating portion, a pressure plate that includes a keyhole that receives the mating portion of the hub plate to couple the hub plate to the pressure plate, and a biasing member configured to be disposed along a shaft of the motor between the motor and the pressure plate. The one or more blades are coupled to the hub between the hub plate and the pressure plate. Additionally, the biasing member is configured to increase friction between the one or more blades and hub plate.

In certain embodiments, the hub is configured to be coaxial with an axis of rotation of the shaft such that the hub rotates about the axis of rotation of the shaft based upon rotation of the shaft. The one or more blades are configured to be rotated by the shaft of the motor based upon rotation of the hub. Additionally, the hub plate includes a keyhole that is configured to receive a key of the shaft to releasably couple the shaft to the hub.

In certain embodiments, the hub plate includes one or more bosses received by apertures within the one or more blades to couple the one or more blades to the hub. One or more fasteners extend through the pressure plate and are received by the one or more bosses of the hub plate.

In certain embodiments, the hub is configured to couple to the shaft of the motor and configured to be rotated with the one or more blades by the shaft of the motor.

In another aspect of the present disclosure, a hub of a propulsion mechanism is disclosed. The hub includes a spring plate assembly configured to couple one or more blades to the hub. The spring plate assembly includes a hub plate having one or more bosses and a mating portion, a pressure plate having a keyhole that is configured to receive the mating portion to align the hub plate with the pressure plate, and a biasing member in communication with the pressure plate and configured to couple to a motor of the propulsion mechanism. The biasing member is configured to bias the pressure plate against the one or more blades to increase friction between the one or more blades and the pressure plate.

In certain embodiments, the spring plate assembly is configured to couple the one or more blades between the hub plate and the pressure plate.

In certain embodiments, the one or more bosses and the mating portion of the hub plate extend from a surface of the hub plate in a direction towards the pressure plate.

In certain embodiments, the biasing member is configured to for positioning around a shaft of the motor so that the biasing member is compressed between the motor and the pressure plate. A first end of the biasing member is positioned in a groove of the pressure plate that at least partially surrounds the keyhole of the pressure plate. Additionally, the spring plate assembly is configured for coupling the hub to the shaft of the motor. The shaft of the motor is configured to extend through both the keyhole of the pressure plate and the mating portion of the hub plate. Moreover, a keyhole of the pressure plate is configured to receive a key of the shaft to couple the hub to the shaft.

In another aspect of the present disclosure, a UAV is disclosed. The UAV includes a propulsion mechanism. The propulsion mechanism includes a motor having a shaft extending from a rotor of the motor, one or more blades configured to be rotated by the shaft of the motor, and a hub having a spring plate assembly that is configured to couple the hub to the shaft of the motor. The spring plate assembly includes a hub plate having a keyhole that is configured to receive a key of the shaft to couple the shaft to the spring plate assembly and a pressure plate spaced apart from the hub plate. The one or more blades are configured to be secured between the hub plate and the pressure plate.

In certain embodiments, the keyhole of the hub plate includes a first keying portion and a second keying portion positioned transverse to the first keying portion. The key of the shaft is configured to extend through the first keying portion and then rotate with respect to the first keying portion so that the key is received by the second keying portion. The first keying portion and the second keying portion are both complementary in shape to the key of the shaft. Additionally, the second keying portion includes a depression, and a projection of the key of the shaft is configured for positioning in the depression to couple the hub to the shaft of the motor. Moreover, the first keying portion and the second keying portion are connected by a shelf extending between the first keying portion and the second keying portion, whereby the projection of the key of the shaft is configured to rotate along the shelf until the key is received by the depression of the second keying portion.

In certain embodiments, the spring plate assembly further includes a biasing member that is configured to bias the pressure plate against the one or more blades.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present disclosure relates to a propulsion mechanism of a UAV. The propulsion mechanism may support flight of the UAV. The propulsion mechanism may facilitate flight of the UAV. One or a plurality of propulsion mechanisms may be coupled to, or integrally formed with, the UAV. The propulsion mechanism may include one or more movable components that facilitate flight of the UAV. By way of example, certain configurations of the propulsion mechanism may include one or more blades (e.g., propeller blades) that are configured to be rotated by a motor, thereby allowing the UAV to take flight. However, it is envisioned that the propulsion mechanism is not limited to any particular structure or components. Thus, various configurations of the propulsion mechanism based on the teachings herein may be possible.

Conventional propulsion mechanisms for UAVs may often include propeller blades that are in communication with one or more motors. The propeller blades may be rotated by the motor to facilitate flight of the UAV. However, to ensure proper rotation of the propeller blades, conventional propulsion mechanisms may frequently require mechanically complex structures and/or may require permanent coupling to the UAV. As a result, replacement of all or a portion of the propulsion mechanism may be difficult. Similarly, the complex and/or permanent coupling of the propulsion mechanism may hinder storage of the UAV when not in operation. For example, due to the complex nature of the structure of the propulsion mechanism, blades of the propulsion mechanism may be substantially rigid and prevented from folding and/or collapsing.

The present teachings provide embodiments of a propulsion mechanism which address the aforementioned challenges as described in further detail below. The propulsion mechanism embodiments as described herein may advantageously be less complex mechanically when compared to conventional propulsion mechanisms. Additionally, the propulsion mechanism embodiments described herein may provide a means for replacement and/or interchangeability with one or more additional propulsion mechanisms. Similarly, the propulsion mechanism embodiments described herein may facilitate removably coupling the propulsion mechanism to the UAV. For example, all or a portion of the propulsion mechanism according to the embodiments hereof may be easily connected and disconnected from the UAV. Moreover, the propulsion mechanism may have improved packaging when the UAV is not in operation. For example, the propulsion mechanism may include one or more portions that are foldable and/or collapsible with respect to the UAV. It should also be noted that though the propulsion mechanism embodiments described herein may have a simpler design and improved packaging, functionality of the propulsion mechanism may not be sacrificed. That is, flight of the UAV may be maintained or even improved with the use of a propulsion mechanism as described herein.

Figure 1:
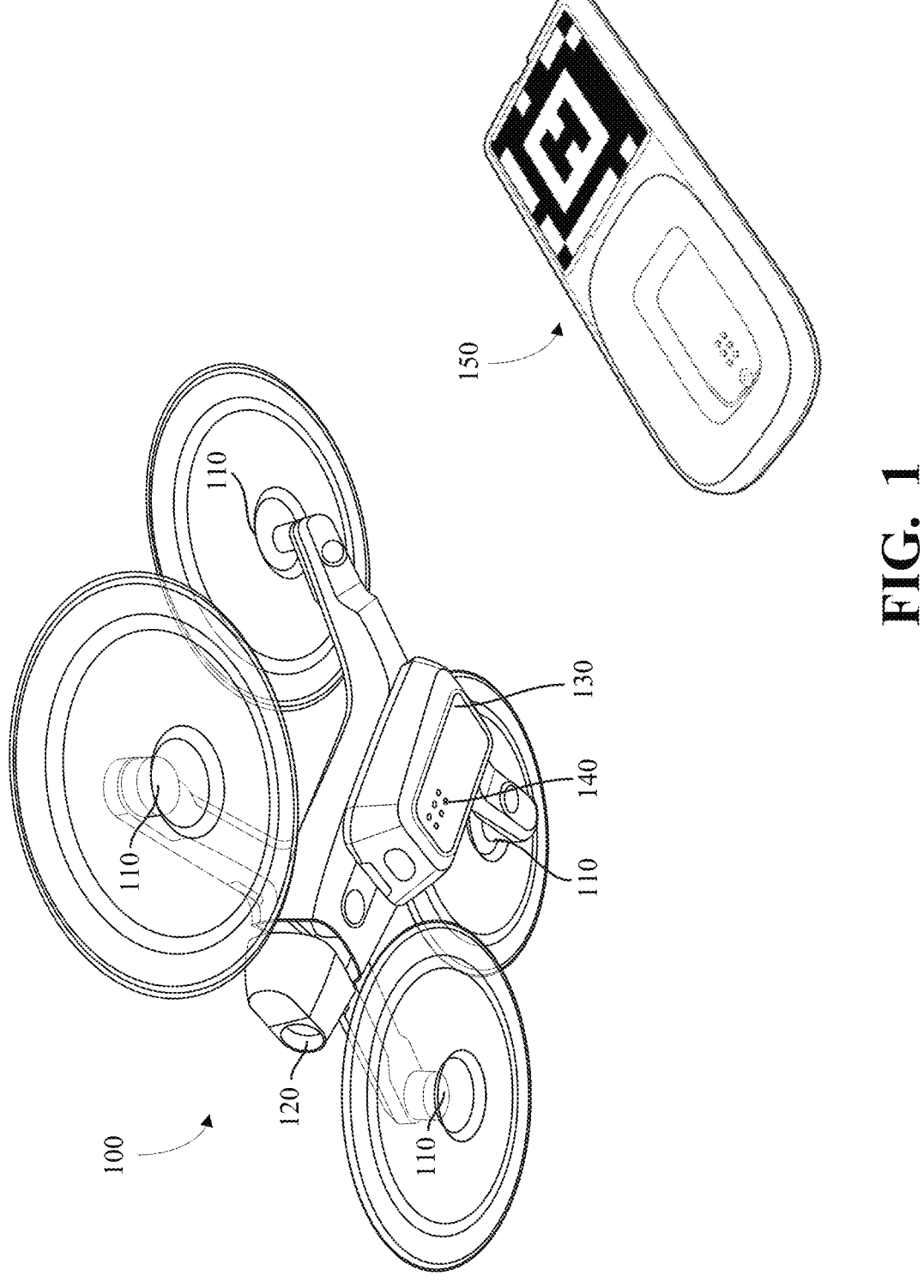
FIG. 1 is a perspective view of an exemplary unmanned aerial vehicle.

Turning now to the figures, FIG. 1 illustrates a perspective view of an unmanned aerial vehicle (UAV) 100. The UAV 100 may include one or more propulsion mechanisms (systems) 110 and a power source, such as a battery 130. The UAV 100 may be configured for autonomous landing and docking with a docking station 150. To support the autonomous landing and docking, the UAV 100 may follow any suitable process or procedure and may include any suitable electrical and/or logical components. For example, the UAV 100 may follow processes or procedures, or may include one or more components, such as those described in U.S. Publication Ser. No. 16/991,122, the entire disclosure of which is herein incorporated by reference.

The propulsion mechanism 110 may include any components and/or structures suitable for supporting flight of the UAV 100. For example, as shown in FIG. 1, the propulsion mechanism 110 may be propeller assemblies having one or more blades connected to hubs of the UAV 100. The one or more blades may be powered by a motor to rotate the one or more blades and facilitate flight of the UAV 100. It should be appreciated, however, that the configuration and/or structure of the UAV 100 may vary depending on the particular of the UAV 100, and as such, the UAV 100 shown in FIG. 1 is not intended to limit the structure of the UAV 100. Additionally, it should be noted that the propulsion mechanism 110 is discussed in further detail below.

The docking station 150 may be configured to receive and/or support the UAV 100. The docking station 150 may include a landing surface configured to receive a portion of the UAV 100 during landing of the UAV 100 on the docking station 150. For example, as shown in FIG. 1, a bottom portion or surface of the UAV 100, such as a portion of the battery 130, may be configured to abut a landing surface of the docking station 150. As a result, the landing surface of the docking station 150 may beneficially guide a shape of the battery 130 so that the plurality of conducting contacts 140 located on an exterior, bottom surface of the battery 130 may align with a plurality of conducting contacts located on the landing surface of the docking station 150. One skilled in the art may glean from the present teachings that communication between the battery 130 and the docking station 150 (or a battery charger therein) may vary.

The UAV 100 may be configured using various processes or protocols to autonomously land on the docking station 150, to autonomously take flight from the docking station 150, or both. To facilitate autonomous landing (e.g., docking) of the UAV 100, the UAV 100 may include an image sensor 120 configured to monitor a position of the UAV 100 and/or detect a specified image, such as the fiducial 170. During a landing sequence (e.g., docking sequence) of the UAV 100, the image sensor 120 of the UAV may detect an image, such as a fiducial disposed on the docking station 150, to properly align and guide the UAV 100 to dock.

Figure 2:
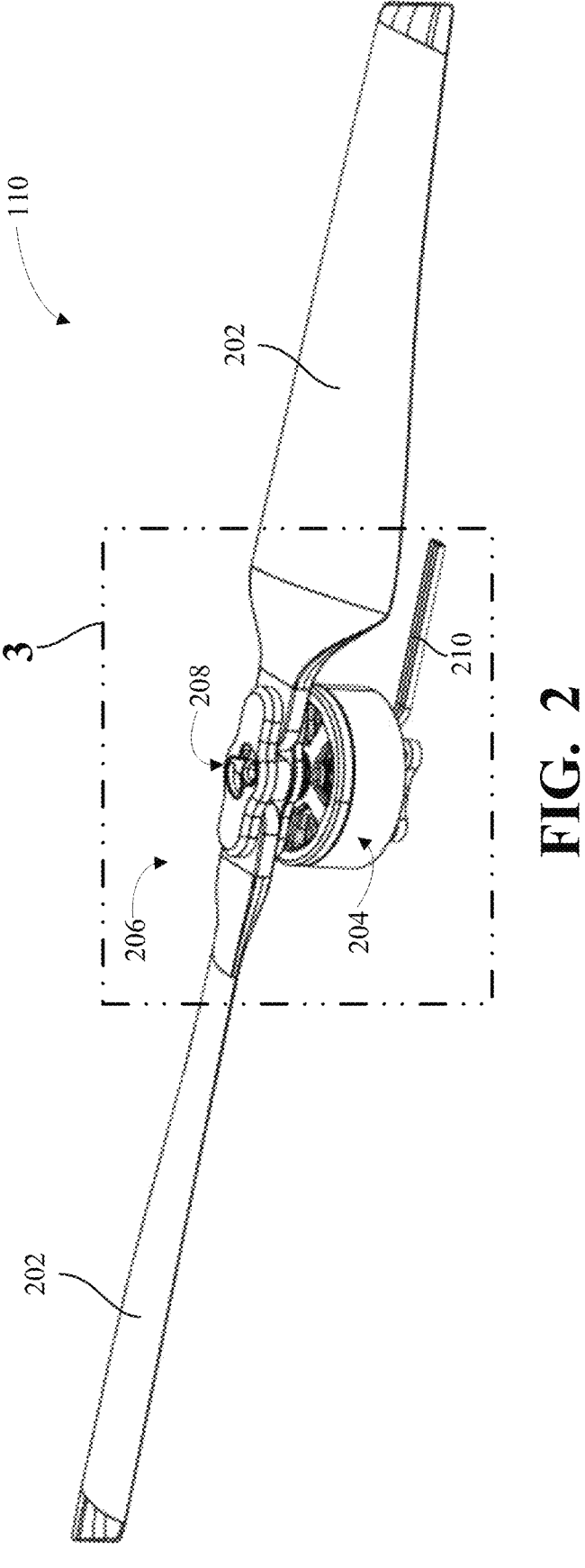
FIG. 2 is a perspective view of a propulsion mechanism for an unmanned aerial vehicle.

FIG. 2 illustrates a perspective view of a propulsion mechanism 110. As discussed above with respect to FIG. 1, the UAV 100 may include one or more propulsion mechanisms, such as the propulsion mechanism 110 shown in FIG. 2. By way of example, the UAV 100 may be a bicopter UAV having a pair of the propulsion mechanisms 110 or the UAV 100 may be a quadcopter UAV having a set of four of the propulsion mechanisms 110. In configurations where the UAV 100 includes more than one of the propulsion mechanisms 110, the propulsion mechanisms 110 may be configured to rotate in the same direction or different directions. For example, the UAV 100 may be a quadcopter in which the UAV 100 includes a first pair of the propulsion mechanisms 110 that rotate in a clockwise direction and a second pair of the propulsion mechanisms 110 that rotate in a counterclockwise direction. However, the above configurations are not intended to be limited and are provided for illustrative purposes.

The propulsion mechanism 110 may include one or more blades 202 in communication with a motor 204 of the propulsion mechanism 110. The blade(s) 202 may be configured to be rotated by the motor 204 to support flight of the UAV 100. The blade(s) 202 may be in communication with the motor 204 via a hub 206 of the propulsion mechanism 110. In particular, the hub 206 may be configured to be coupled to the motor 204 to facilitate communication between the motor 204 and the blade(s) 202.

The hub 206 may include a spring plate assembly 208. The spring plate assembly 208 may be configured to couple the blade(s) 202 to the hub 206 so that the motor 204 may rotate both the hub 206 and the blade(s) 202. As discussed in further detail below, in certain configurations the hub 206 may be configured to couple (e.g., releasably couple) to a shaft of the motor 204 so that all or a portion of the hub 206 may be rotated with the blade(s) 202 by the shaft of the motor 204 based upon power received by the motor 204 through wiring 210 of the motor 204. It should be noted that while a pair of the blades 202 are shown in FIG. 2, any number of the blade(s) 202 may be coupled to the spring plate assembly 208 of the hub 206, depending on the configuration of the propulsion mechanism 110.

Figure 3:
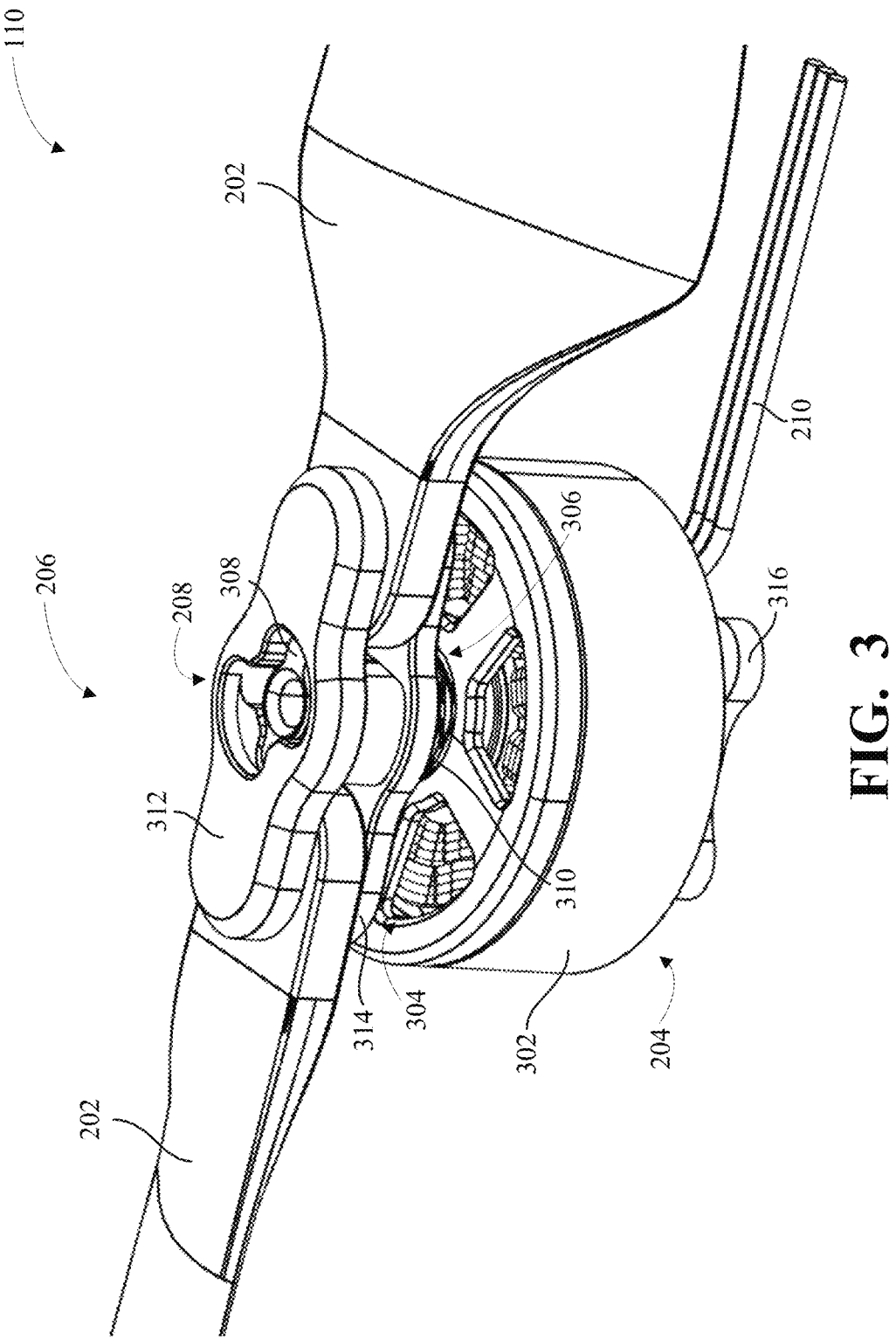
FIG. 3 is a close-up view of the propulsion mechanism of FIG. 2.

FIG. 3 illustrates close-up view 3 of the propulsion mechanism 110 shown in FIG. 2. As discussed above, the propulsion mechanism 110 may include the hub 206 having the spring plate assembly 208 that may couple the blade(s) 202 of the propulsion mechanism 110 to the hub 206.

The spring plate assembly 208 may be coupled to, or in communication with, the motor 204 of the propulsion mechanism 110. As discussed above, the motor 204 may receive power through the wiring 210 extending between a motor housing 302 of the motor 204 and a power source, such as the battery 130 of the UAV 100. However, the motor 204 may be powered by any power source of the UAV 100. For example, the propulsion mechanism 110 may include a dedicated power source, such as a dedicated battery separate from the battery 130, that may be disposed in, or coupled to, the motor housing 302. In such a case, the wiring 210 may be eliminated or incorporated into the motor housing 302.

The motor 204 may include a stator 304 and a rotor 306. While the propulsion mechanism is not limited to any particular type of motor, as shown in FIG. 3, the stator 304 may at least partially surround the rotor 306 of the motor 204 and may be configured to rotate the rotor 306. A shaft 308 may extend from the rotor 306 of the motor 204 and may be configured to rotate based on rotation of the rotor 306. The shaft 308 may be coupled to, or integrally formed with, the rotor 306. The shaft 308 may also be configured to couple the spring plate assembly 208 of the hub 206 to the motor 204 so that the spring plate assembly 208 is biased away from the motor housing 302 by a biasing member 310 disposed along the shaft 308 of the motor 204. The biasing member 310 may be a spring, compressible member, elastic member, or a combination thereof.

The spring plate assembly 208 may include a hub plate 312 and a pressure plate 314. The spring plate assembly 208 may be configured to couple the blade(s) 202 between the hub plate 312 and the pressure plate 314. The spring plate assembly 208 may also be configured to couple to the shaft 308 of the motor 204 so that the blade(s) 202 are biased away from the motor 204, and in particular the motor housing 302, by the biasing member 310 located between the spring plate assembly 208 and the motor housing 302. In particular, the biasing member 310 may be in communication with the pressure plate 314 and located between the motor 204 (e.g., the motor housing 302) and the pressure plate 314 so that the biasing member 310 may bias the blade(s) 202 away from the motor 204. Advantageously, as a result of biasing the blade(s) 202 away from the motor 204, the blade(s) 202 may remain substantially stationary with respect to the spring plate assembly 208, thereby decreasing rattling and/or wobbling of the blade(s) 202 between the hub plate 312 and the pressure plate 314.

The motor 204 may be configured to mount to the UAV 100 using a mounting bracket 316. The motor 204 may be fixedly coupled to the UAV 100 by the mounting bracket 316 so that movement of the propulsion mechanism 110 (e.g., the blade(s) 202 being rotated by the shaft 308 of the rotor 306) may facilitate flight of the UAV 100. Beneficially, the hub 206 may easily couple to and uncouple from the shaft 308 of the motor 204 even after the propulsion mechanism 110 is secured to the UAV 100 by the mounting bracket 316. That is, the shaft 308 may removably connect to the spring plate assembly 208 so that all or a portion of the hub 206 may be replaced and/or changed without requiring disconnection between the propulsion mechanism 110 and the UAV 100.

Figure 4:
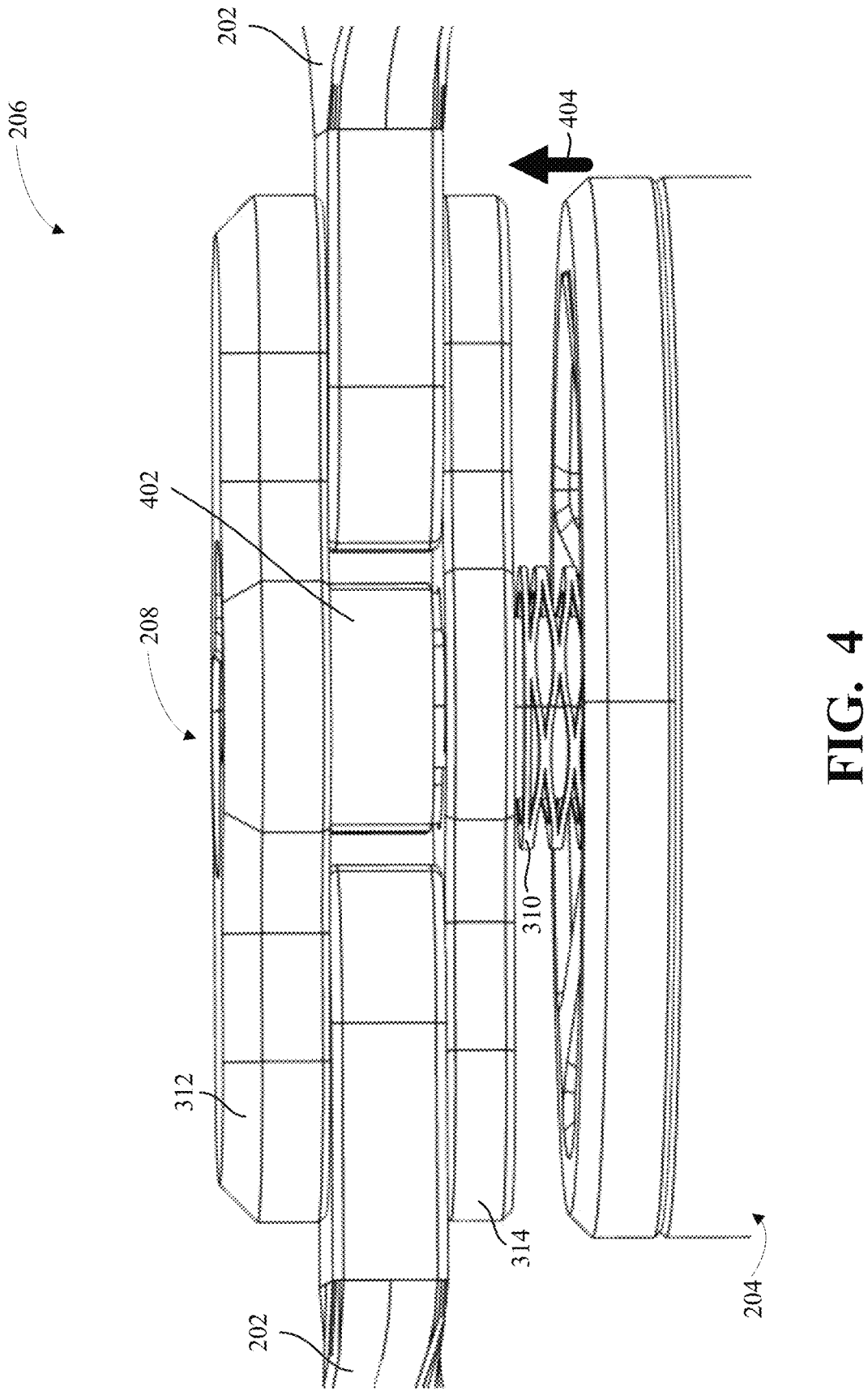
FIG. 4 is a side view of a hub of a propulsion mechanism for an unmanned aerial vehicle.

FIG. 4 illustrates a side view of the hub 206 of the propulsion mechanism 110. As discussed above, the hub 206 may include the spring plate assembly 208 that is configured to couple the hub 206 to the shaft 308 of the motor 204. The spring plate assembly 208 may include the hub plate 312 and the pressure plate 314 spaced apart from the hub plate 312.

The hub plate 312 and the pressure plate 314 may be spaced apart and form a gap therebetween to receive the blade(s) 202 and secure the blade(s) between hub plate 312 and the pressure plate 314. In particular, the hub plate 312 may include a projection 402 that extends in a direction toward the pressure plate 314 and configured to abut the pressure plate 314. As discussed in further detail below, the projection 402 may include a mating portion that is received by the pressure plate 314. As a result, the gap as measured between the hub plate 312 and the pressure plate 314 that receives the blade(s) 202 may be the same as, or similar to, a length of the projection 402 as measured from a base of the projection 402 along a surface of the hub plate 312 to a distal end of the projection 402. However, the gap between the hub plate 312 and the pressure plate 314 may vary depending on various configurations of the UAV 100. For example, a thickness of the blade(s) 202 may vary depending on the size and/or weight of the UAV 100. As a result, the spring plate assembly 208 may require varying widths of the gap between the hub plate 312 and the pressure plate 314 to accommodate the varying thicknesses of the blade(s) 202. In certain configurations, a distance between the hub plate 312 and the pressure plate 314 may be adjustable.

The spring plate assembly 208 may also include the biasing member 310. The biasing member 310 may be configured to be disposed around the shaft 308 of the motor 204 so that the biasing member 310 is compressed between the motor 204 (e.g., the motor housing 302) and the pressure plate 314. As a result, the biasing member 310 may beneficially bias the pressure plate 314 in a direction 404, as shown in FIG. 4. As a result, the biasing member 310 may also be configured to bias the pressure plate 314 against the blade(s) 202 in the direction 404, whereby the pressure plate 314 may then be configured to bias the blade(s) 202 against the hub plate 312. As a result, the biasing member 310 may advantageously compress a portion of the blade(s) between the hub plate 312 and the pressure plate 314 (e.g., increase friction therebetween), thereby preventing wobbling and/or rattling of the blade(s) 202 during rotation of the shaft 308 of the motor 204. That is, the blade(s) 202 may be biased in the direction 404 to maintain a planar position of the blade(s) 202 during rotation of the blade(s) 202 (e.g., the blade(s) 202 remain substantially planar during rotation).

Figure 5:
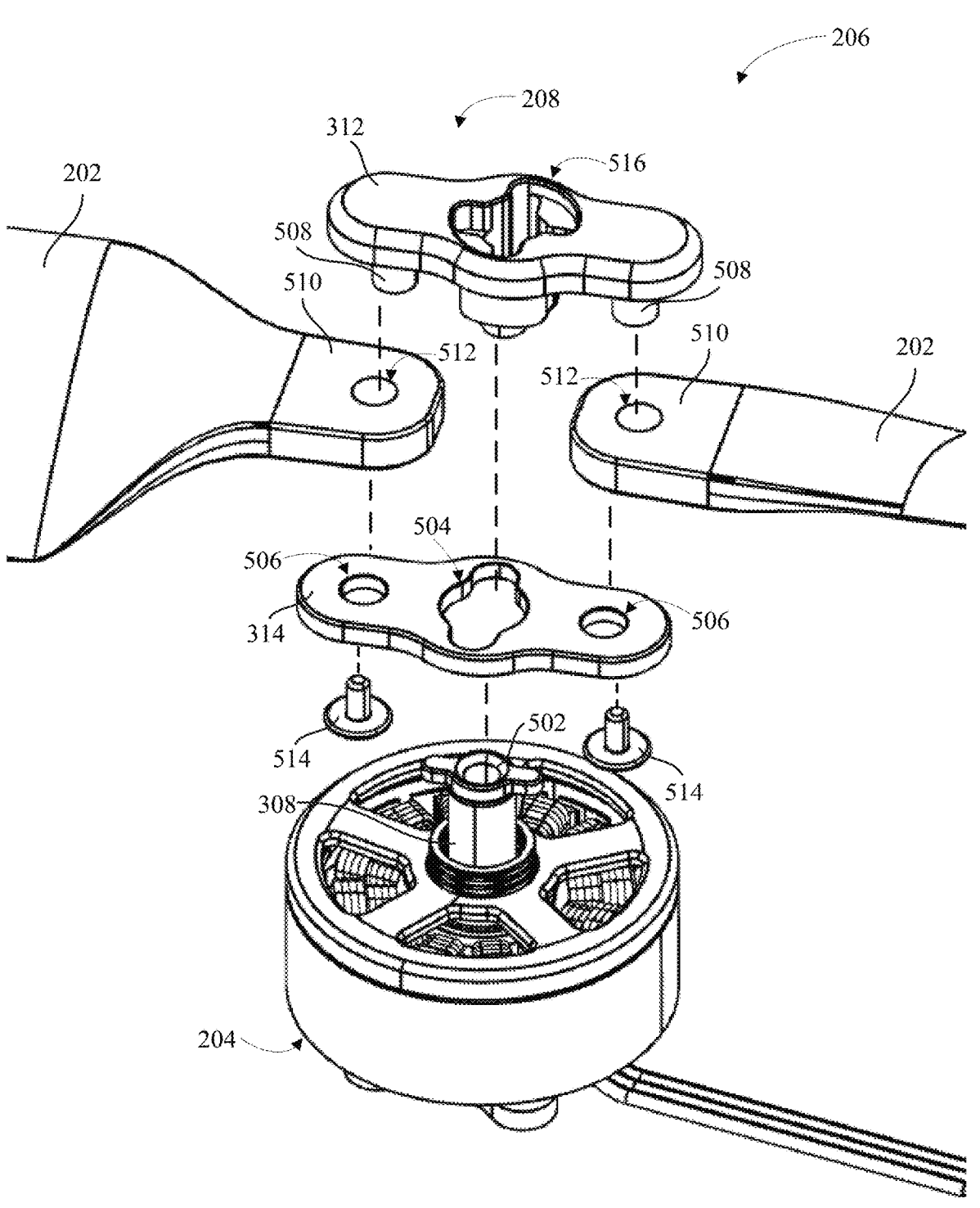
FIG. 5 is an exploded view of a hub of a propulsion mechanism for an unmanned aerial vehicle.

FIG. 5 illustrates an exploded view of the hub 206 of the propulsion mechanism 110. As discussed above, the hub 206 may include the spring plate assembly 208 that is configured to couple the blade(s) 202 to the motor 204 so that the motor 204 rotates the blade(s) 202 and facilitates flight of the UAV 100.

To couple the spring plate assembly 208 to the motor 204, the shaft 308 of the motor 204 may extend through both the pressure plate 314 and the hub plate 312 of the spring plate assembly 208. In particular, the pressure plate 314 may include a keyhole 504 and the hub plate 312 may include a keyhole 516. A key 502 of the shaft 308 may extend through both the keyhole 504 of the pressure plate 314 and the keyhole 516 of the hub plate 312, thereby coupling the spring plate assembly 208 to the shaft 308 of the motor 204.

Advantageously, the shaft 308 may extend through the keyholes 504, 516 so that the hub plate 312, the pressure plate 314, and the shaft 308 of the motor may axially align with one another. Therefore, the shaft 308 may rotate the spring plate assembly 208 and the blade(s) 202 about a longitudinal (e.g., rotational) axis of the shaft 308.

To couple the blade(s) 202 between the pressure plate 314 and the hub plate 312, an attachment portion 510 of the blade(s) 202 may be positioned between the pressure plate 314 and the hub plate 312. One or more bosses 508 of the hub plate 312 may be received by apertures 512 of the blade(s) 202 located on the attachment portion 510 of the blade(s) 202 to align the blade(s) 202 with the hub plate 312 and/or partially secure the blade(s) 202 to the hub plate 312. Additionally, the boss(es) 508 may at least partially extend through apertures 506 of the pressure plate 314 so fasteners 514 may be received by the boss(es) 508 to secure the hub plate 312, the pressure plate 314, and the blade(s) 202 together. As a result, the apertures 506 of the pressure plate 314 and the apertures 512 of the blade(s) 202 may be axially aligned to receive the boss(es) 508 of the hub plate 312.

It should be noted that the spring plate assembly 208 in certain configurations may vary in size and/or shape to accommodate any desired number of blade(s) 202. For example, the spring plate assembly 208 may be configured to couple a single blade, a pair of the blade(s) 202 as shown in FIG. 5, or three or more blades to the spring plate assembly 208. The number of boss(es) 508, the number of the apertures 506, the number of fasteners 514, or a combination thereof may be based upon the number of blade(s) 202 being coupled to the spring plate assembly 208.

Figure 6A:
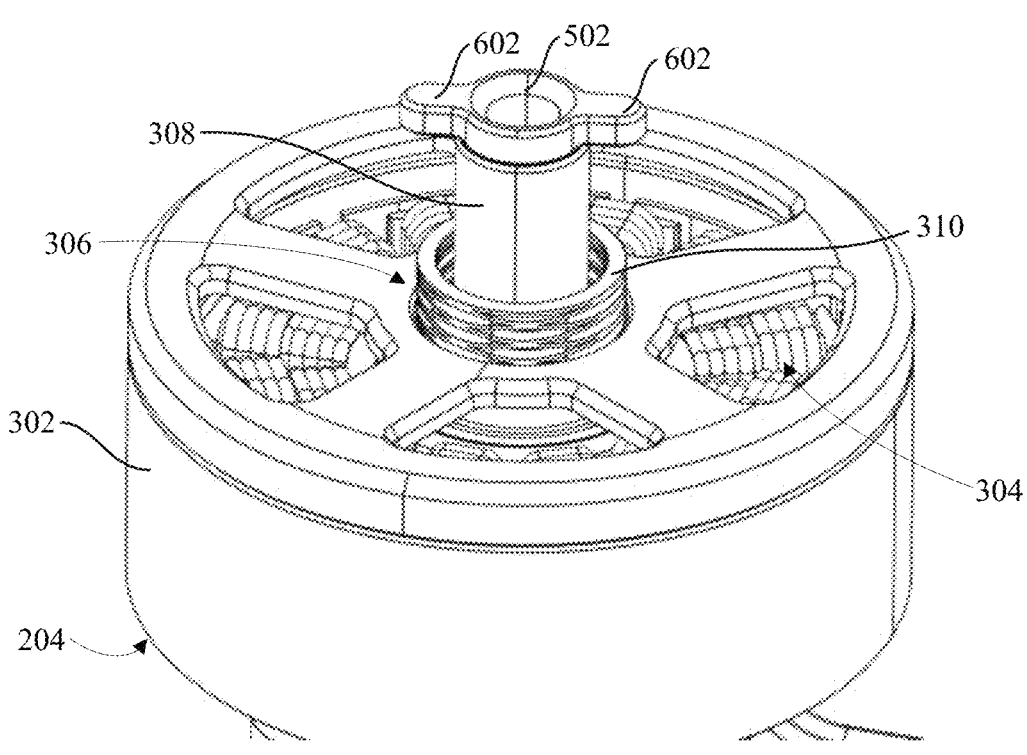
FIG. 6A is a top perspective view of a motor of a propulsion mechanism.
Figure 6B:
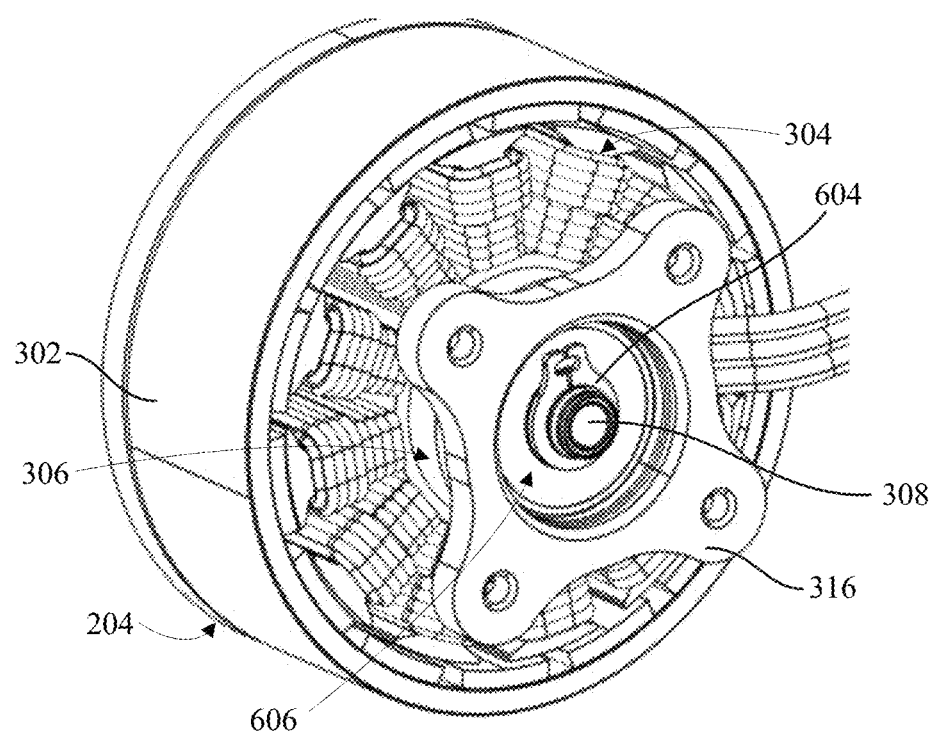
FIG. 6B is a bottom perspective view of the motor of FIG. 6A.

FIGS. 6A and 6B illustrate a top perspective view and a bottom perspective view, respectively, of the motor 204 of the propulsion mechanism 110. The motor 204 may include the motor housing 302, whereby the motor housing 302 may at least partially house the componentry of the motor 204. For example, the stator 304 may be disposed in the motor housing 302 and may at least partially encompass the rotor 306 of the motor 204. Additionally, a shaft 308 of the motor may project from the rotor 306 to couple to the spring plate assembly 208, as described above. As shown in FIG. 6A, the biasing member 310 may be positioned around the shaft 308 so that, when the spring plate assembly 208 is coupled to the shaft 308, the biasing member 310 is compressed between the pressure plate 314 of the spring plate assembly 208 and a portion of the motor 204, such as the motor housing 302, the rotor 306, or both.

The shaft 308 may also include a key 502. The key 502 may include one or more projections 602 that are configured to engage the keyhole 516 of the hub plate 312. As discussed in further detail below, the projections 602 of the key 502 may be complimentary in shape to a portion of the keyhole 516 of the hub plate 312 to maintain a position of the shaft 308 with respect to the spring plate assembly 208, thereby facilitating rotation of the spring plate assembly 208 with the shaft 308.

The projections 602 may extend in any desired direction and may vary in size and/or shape. The projections 602 may radially extend away from the shaft 308 along substantially the same plane or different planes. The projections 602 may extend generally orthogonally to the longitudinal axis (e.g., the rotational axis) of the shaft 308 or at any desired angle. However, as stated above, it is envisioned that the projections 602 may be complimentary in size and/or shape to a portion of the keyhole 516 of the hub plate 312 to ensure proper coupling of the shaft 308 to the hub plate 312. Similarly, the number of projections 602 located along the key 502 of the shaft 308 may be dictated by the number of complimentary receiving portions located along the keyhole 516 of the hub plate 312 (e.g., depressions as described below).

The shaft 308 may be integrally formed with, or coupled to, the rotor 306 of the motor 204. For example, as shown in FIGS. 6A and 6B, the shaft 308 may extend through the rotor 306 and into a channel 606 of the mounting bracket 316 of the motor 204. An end portion of the shaft 308 may then be secured in place by a clip 604, thereby preventing unwanted axial and/or lateral movement of the shaft 308 with respect to the motor 204.

Additionally, to facilitate rotation of the shaft 308 and/or the rotor 306 with respect to the mounting bracket 316, one or more bearings (e.g., ball bearings, thrust bearings, etc.), one or more bushings, or both may be located between the shaft 308 and the mounting bracket 316. For example, though not shown, a ball bearing may be positioned within a cavity of the mounting bracket 316 and adjacent to the shaft 308. Similarly, the mounting bracket 316 may be integrally formed with, or coupled, to a bearing housing that contains one or more bearings, whereby the shaft 308 may extend through both the mounting bracket 316 and the bearing housing. For example, one or more ball bearings may be contained within a bearing housing and the bearing housing may be disposed inside a cavity or interior region of the mounting bracket 316. The shaft 308 may extend through the bearing housing so that the one or more ball bearings at least partially surround an outer surface of the shaft 308. Additionally, the shaft 308 may include one or more notches or grooves that align with the one or more bearings to ensure proper engagement between the one or more bearings and the shaft 308. Such notches or grooves may extend along an outer surface of the shaft 308 (e.g., the circumference of the shaft 308) transverse to a longitudinal axis of the shaft 308 (e.g., the axis of rotation of the shaft 308).

It should be noted that the motor 204 may be any desired type of motor. The motor 204 may be a brushed motor or may be a brushless motor. The motor 204 may be a DC motor or an AC motor. The motor 204 may be a stepped motor. The motor 204 may be a series-wound motor, a shunt wound motor, a compound wound motor, or a permanent magnet motor. The motor 204 may be a synchronous motor or an induction motor (e.g., a single phase or three phase motor). As such, the present teachings may incorporate any type of motor based upon a desired configuration of the UAV 100.

Figure 7A:
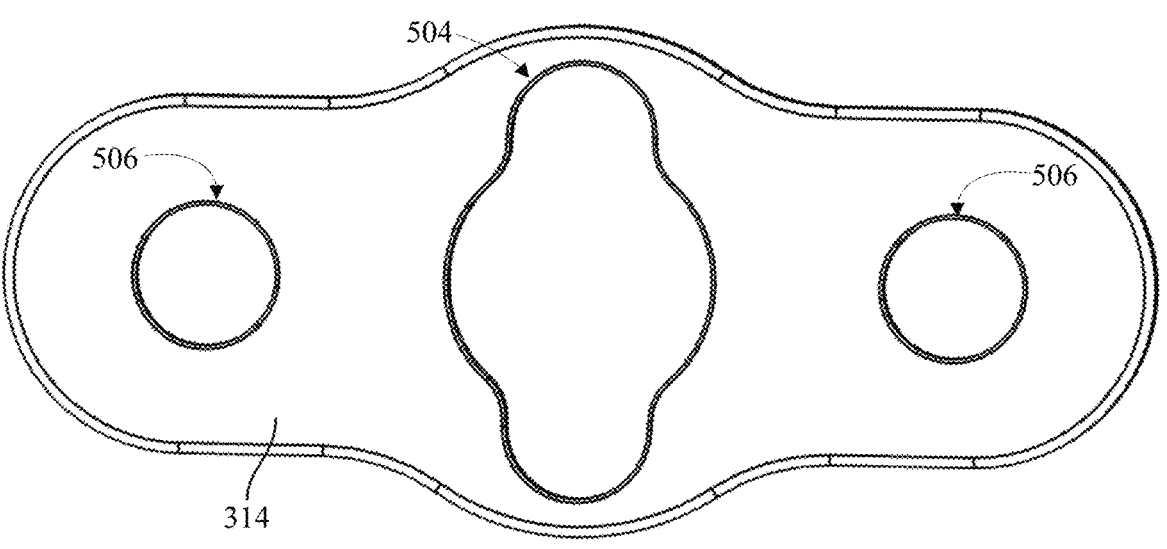
FIG. 7A is a top view of a pressure plate of a propeller hub.
Figure 7B:
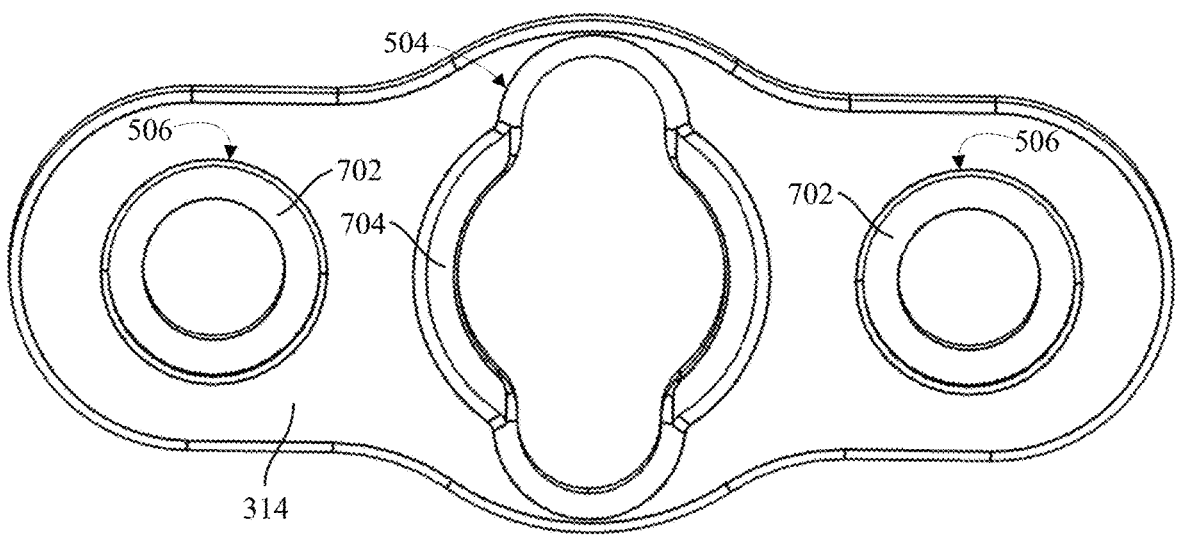
FIG. 7B is a bottom view of the pressure plate of FIG. 7A.

FIGS. 7A and 7B illustrate a top view and a bottom view, respectively, of the pressure plate 314. As discussed above, the pressure plate 314 may be part of the spring plate assembly 208 and may be configured to bias the blade(s) 202 of the propulsion mechanism 110.

The pressure plate 314 may include the keyhole 504 centrally disposed along a length and/or width of the pressure plate 314. The keyhole 504 may be configured to receive a mating portion of the hub plate 312, as discussed in further detail below. That is, the keyhole 504 may be complimentary in shape with the mating portion of the hub plate 312 to receive at least a portion of the mating portion therein. The keyhole 504 may be configured to receive the mating portion of the hub plate 312 to align the hub plate 312 with the pressure plate 314.

The keyhole 504 may also include a groove 704 that at least partially surrounds the keyhole 504. The keyhole 504 may be configured to receive a portion of the biasing member 310 so that the biasing member 310 is axially aligned with a rotational axis of the pressure plate 314. For example, a first end of the biasing member 310 may be positioned in the groove 704 of the pressure plate 314 that at least partially surrounds the keyhole 504 while an opposing second end of the biasing member 310 abuts the motor 204. As a result, a lateral position of the biasing member 310 may be substantially maintained when the biasing member 310 is compressed between the pressure plate 314 and the motor 204.

Additionally, the pressure plate 314 may include the apertures 506 located on opposing sides of the keyhole 504. The apertures 506 may be configured to receive the fasteners 514 therein. For example, the fasteners 514 may extend through the apertures 506 and into the boss(es) 508 of the hub plate 312 to secure the hub plate 312, the pressure plate 314, and the blade(s) 202 together. As shown in FIG. 7B, the apertures 506 may each include a groove 702 extending around the aperture 506. The groove 702 may be complimentary in shape to a head of the fasteners 514 so that, when the fasteners 514 are secured in the boss(es) 508 of the hub plate 312, the head of the fasteners 514 are coplanar with the surface of the pressure plate 314. That is, the fasteners 514 may not project from the surface of the pressure plate 314, thereby improving packaging and ensuring operation of the propulsion mechanism 110 is unencumbered by the fasteners 514.

Figure 8A:
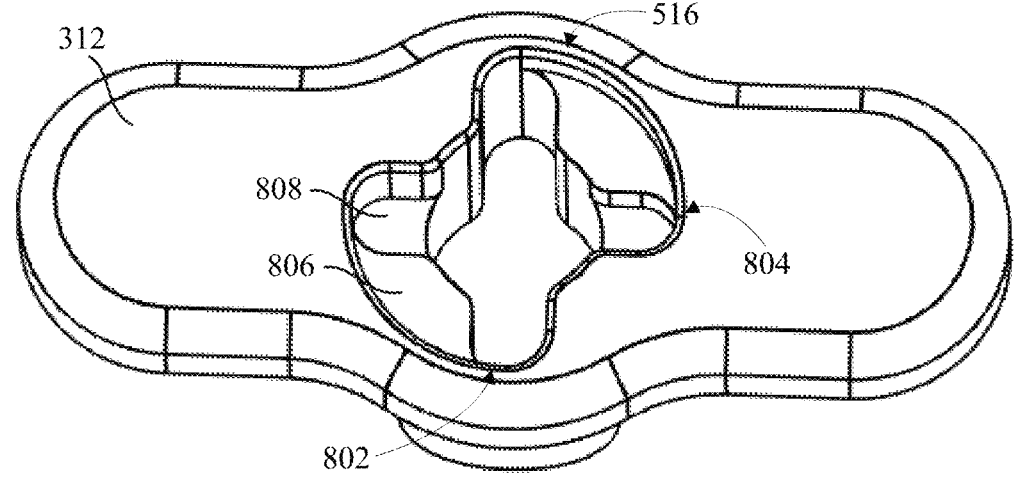
FIG. 8A is a top perspective view of a hub plate of a hub.
Figure 8B:
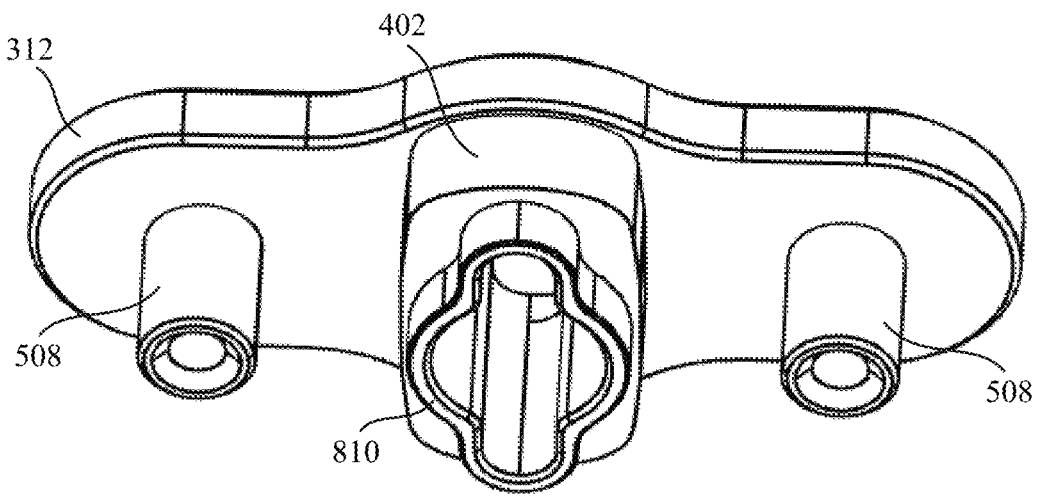
FIG. 8B is a bottom perspective view of the hub plate of FIG. 8A.

FIGS. 8A and 8B illustrate a top perspective view and a bottom perspective view, respectively, of the hub plate 312. As discussed above, the hub plate 312 may be part of the spring plate assembly 208 and may be configured to couple the spring plate assembly 208 to the shaft 308 of the motor 204.

The hub plate 312 may include the keyhole 516. The keyhole 516 may be configured to receive the key 502 of the shaft 308 to couple the shaft 308 to the spring plate assembly 208. The keyhole 516 may include a first keying portion 802 and a second keying portion 804 positioned transverse to the first keying portion 802. It should be noted that the first keying portion 802 may be positioned in any manner with respect to the second keying portion 804. As shown in FIG. 8A, the first keying portion 802 and the second keying portion 804 may be coaxial along the axis of rotation of the hub plate 312.

The first keying portion 802 and/or the second keying portion 804 may be complimentary in shape to the key 502 (e.g., the projections 602 located on the key 502) of the shaft 308 so that the key 502 of the shaft 308 may extend through the first keying portion 802 and/or the second keying portion 804. For example, the key 502 of the shaft 308 may be configured to extend through the first keying portion 802 and then rotate with respect to the second keying portion 804 so that the key 502 is received by the second keying portion 804. To receive the key 502 of the shaft 308, the second keying portion 804 may include one or more depression(s) 808. The projections 602 of the key 502 may be configured to be positioned in the depression(s) 808 to couple the hub 206 or the spring plate assembly 208 of the hub 206 to the shaft 308 of the motor 204.

Advantageously, due to the biasing member 310 biasing the pressure plate 314 towards the hub plate 312, the keyhole 516 of the hub plate 312 may be biased towards the key 502 of the shaft 308. That is, once the key 502 of the shaft 308 is positioned in the second keying portion 804, the biasing member 310 may bias the depression(s) 808 of the second keying portion 804 towards the projections 602 of the key 502 to maintain engagement between the key 502 and the second keying portion 804. Therefore, the biasing member 310 may aid in preventing unwanted uncoupling of the spring plate assembly 208 and the shaft 308.

The first keying portion 802 and the second keying portion 804 may be connected by a shelf 806 extending between the first keying portion 802 and the second keying portion 804. The shelf 806 may extend between the depression(s) 808 of the second keying portion 804 and the first keying portion 802. The key 502 of the shaft 308 may be inserted into and through the first keying portion 802 until the key 502 extends beyond the shelf 806. The projections 602 of the key 502 may then be configured to rotate along the shelf 806 until the key 502 is received by the depression (s) 808 of the second keying portion 804.

The keyhole 516 may be located on an opposing surface of the hub plate 312 to the projection 402. As discussed above, the projection 402 may extend from the hub plate 312 and may include a mating portion 810. The mating portion 810 may be configured to couple to, or abut, the keyhole 504 of the pressure plate 314 to align the hub plate 312 and the pressure plate 314. The mating portion 810 may be located on an end of the projection 402 away from the hub plate 312 so that the mating portion 810 may be received by the keyhole 504 of the pressure plate 314. The mating portion 810 may also include a complimentary shape to mate with the keyhole 504 of the pressure plate 314. Advantageously, such a shape of the mating portion 810 and the keyhole 504 may prevent rotation of the pressure plate 314 relative to the hub plate 312, or vice versa.

The boss(es) 508 and the mating portion 810 (e.g., the mating portion 810 and the projection 402) may extend from a surface of the hub plate 312 in a direction towards the pressure plate 314. The boss(es) 508 may extend into and through the apertures 512 of the blade(s) 202 and into the apertures 506 of the pressure plate 314 to couple the blade(s) 202 between the hub plate 312 and the pressure plate 314 using the fasteners 514. The boss(es) 508 may include an internal portion to receive the fasteners 514, such as a threaded hole to engage the fasteners 514. Additionally, the boss(es) 508 may project form the hub plate 312 the same distance, a greater distance, or a shorter distance than the mating portion 810.

Figures 9A, 9B:
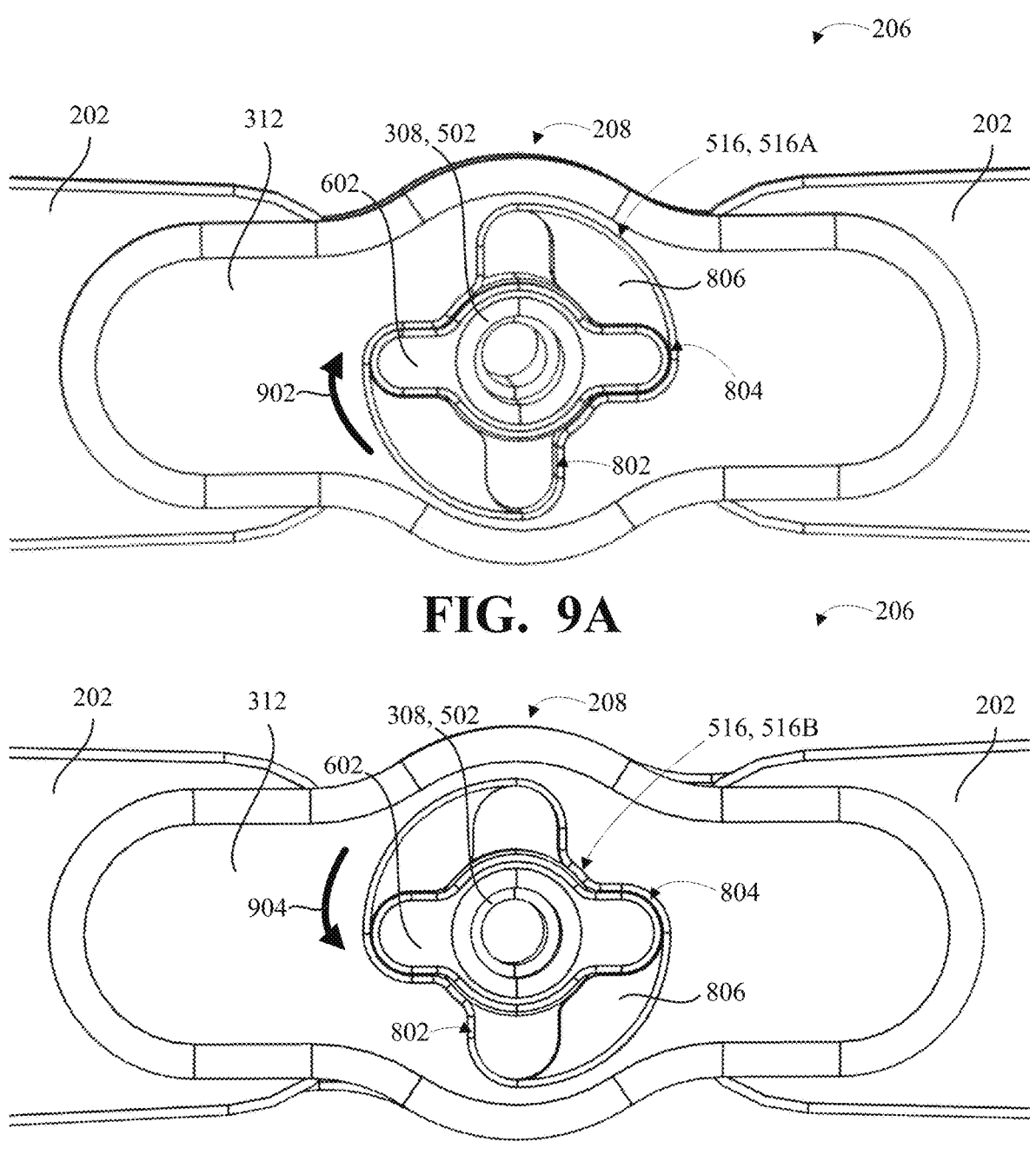
FIG. 9A is a top view of a hub of a propulsion mechanism for an unmanned aerial vehicle rotating in a clockwise direction.
FIG. 9B is a top view of a hub of a propulsion mechanism for an unmanned aerial vehicle rotating in a counterclockwise direction.

FIGS. 9A and 9B illustrate top views of the hub 206 of the propulsion mechanism 110 for the UAV 100. As discussed above, the hub 206 may include a spring plate assembly 208 that is configured to couple the blade(s) 202 to the shaft 308 of the motor 204. The blade(s) 202 may be positioned between the pressure plate 314 and the hub plate 312 to secure the blade(s) 202 during operation.

The shaft 308 of the motor 204 may be configured to extend through both the keyhole 504 of the pressure plate 314 and the mating portion 810 of the hub plate 312 so that the key 502 of the shaft 308 is positioned in the keyhole 516 of the hub plate 312. As discussed above, the projections 602 of the key 502 of the shaft 308 may extend through the first keying portion 802 of the keyhole 516, rotate along the shelf 806, and be received in the depression(s) 808 of the second keying portion 804 of the keyhole 516 to secure the shaft 308 to the spring plate assembly 208. Once the shaft 308 is coupled to the spring plate assembly 208, rotation of the shaft 308 may result in rotation of the spring plate assembly 208, and thus also rotation of the blade(s) 202.

The propulsion mechanism 110 may be configured to rotate the blade(s) 202 in a clockwise direction 902, a counterclockwise direction 904, or both. FIG. 9A illustrates the propulsion mechanism 110 rotating the blade(s) 202 in the clockwise direction 902 while FIG. 9B illustrates the propulsion mechanism 110 rotating the blade(s) 202 in the counterclockwise direction 904.

As shown in FIG. 9A, to ensure coupling of the shaft 308 to the spring plate assembly 208 during rotation of the blade(s) 202 in the clockwise direction 902, the hub plate 312 may include a first configuration 516A of the keyhole 516. The first configuration 516A of the keyhole 516 may include the shelf 806 located between the first keying portion 802 and the second keying portion 804 so that the projections 602 of the key 502 of the shaft 308 rotate along the shelf 806 in the clockwise direction 902 until the projections 602 are positioned in the depression(s) 808 of the second keying portion 804. Advantageously, the projections 602 may abut a wall or side of the second keying portion 804 when rotated in the clockwise direction 902 when in the depression(s) 808. As a result, as the shaft rotates the blade(s) 202, the projections 602 may maintain contact with the wall or side of the second keying portion 804, thereby aiding with driving the spring plate assembly 208 and the blade(s) 202 to rotate.

Conversely, as shown in FIG. 9B, to ensure coupling of the shaft 308 to the spring plate assembly 208 during rotation of the blade(s) 202 in the counterclockwise direction 904, the hub plate 312 may include a second configuration 516B of the keyhole 516. The second configuration 516B of the keyhole 516 may include the shelf 806 located between the first keying portion 802 and the second keying portion 804 so that the projections 602 of the key 502 of the shaft 308 rotate along the shelf 806 in the counterclockwise direction 904 until the projections 602 are positioned in the depression(s) 808 of the second keying portion 804. The projections 602 may abut a wall or side of the second keying portion 804 when rotated in the counterclockwise direction 904 when in the depression(s) 808. As a result, as the shaft rotates the blade(s) 202, the projections 602 may maintain contact with the wall or side of the second keying portion 804, thereby aiding with driving the spring plate assembly 208 and the blade(s) 202 to rotate.

It should be noted that while the hub plate 312 may include the first configuration 516A of the keyhole 516 shown in FIG. 9A or the second configuration 516B of the keyhole 516 shown in FIG. 9B, in certain embodiments, the hub plate 312 may include both the first configuration 516A and the second configuration 516B of the keyhole 516. For example, the hub plate 312 may be universal so that the hub plate 312 may be used both for the clockwise rotation and the counterclockwise rotation of the shaft 308 and the blade(s) 202.

Figure 10A:
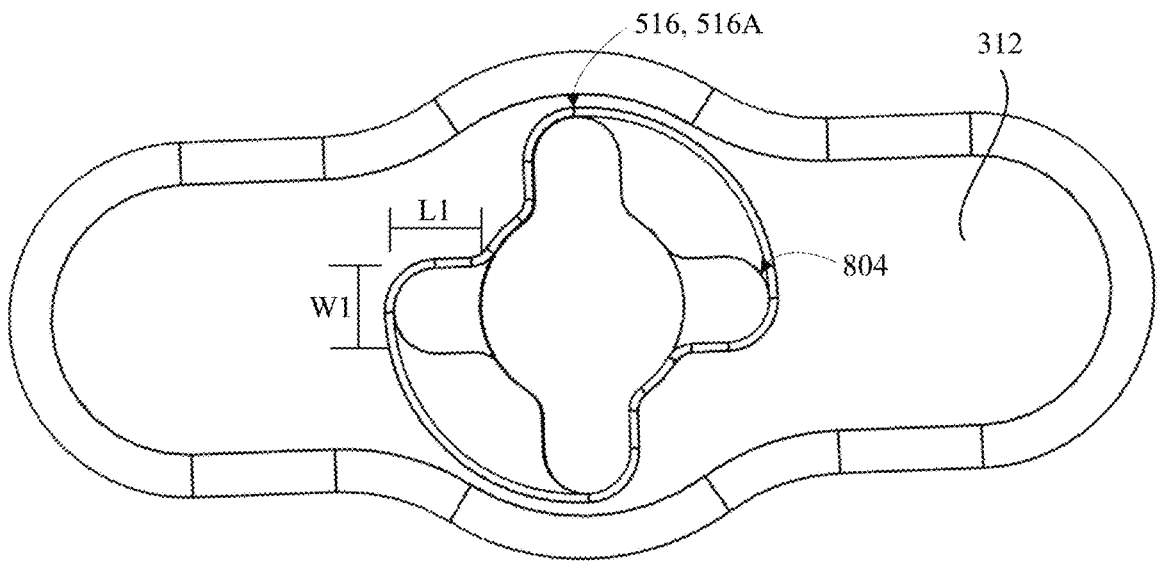
FIG. 10A is a top view of a hub plate of a propeller hub configured for a shaft of a motor rotating in a counterclockwise direction.
Figure 10B:
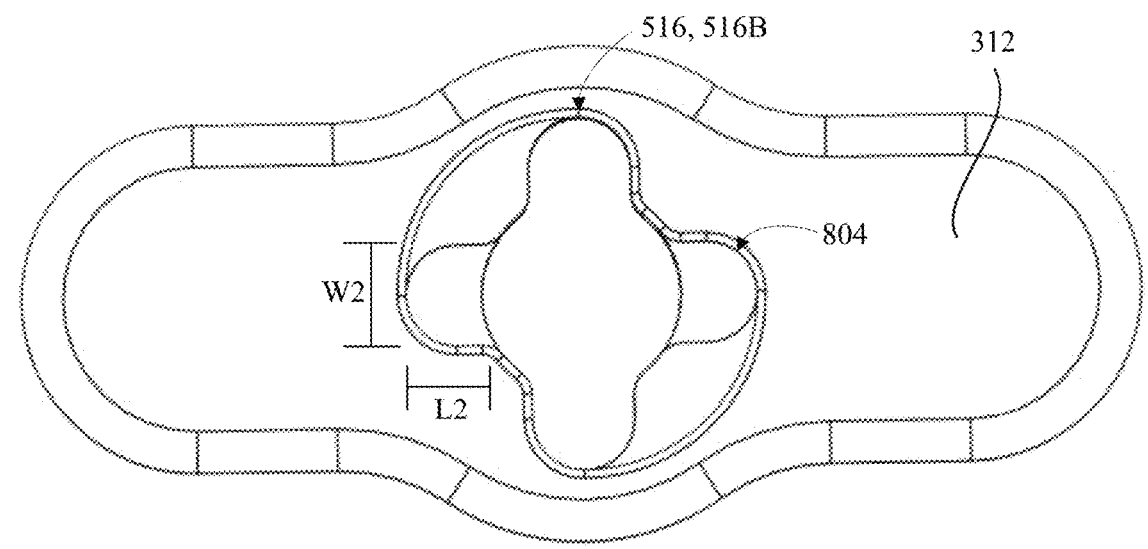
FIG. 10B is a top view of a hub plate of a propeller hub configured for a shaft of a motor rotating in a clockwise direction.

FIGS. 10A and 10B illustrate top views of the hub plate 312. The hub plate 312 may include the first configuration 516A of the keyhole 516, as shown in FIG. 10A, or may include the second configuration 516B of the keyhole 516, as shown in FIG. 10B. As discussed above, the first configuration 516A and the second configuration 516B may facilitate clockwise rotation or counterclockwise rotation of the blade(s) 202.

As stated above, the first configuration 516A of the keyhole 516 may be configured for clockwise rotation of the blade(s) 202 while the second configuration 516B of the keyhole 516 may be configured for counterclockwise rotation of the blade(s) 202. To prevent the coupling of the hub plate 312 with the first configuration 516A of the keyhole 516 when the propulsion mechanism 110 is configured to rotate in the counterclockwise direction 904 and/or to prevent the coupling of the hub plate 312 with the second configuration 516B of the keyhole 516 when the propulsion mechanism 110 is configured to rotate in the clockwise direction 902, sizing of the keyhole 516 may differ between the first configuration 516A and the second configuration 516B.

The sizing of the first keying portion 802 and/or the second keying portion 804 may vary between the first configuration 516A and the second configuration 516B of the keyhole 516. In particular, the depression(s) 808 of the second keying portion 804 may differ between the first configuration 516A and the second configuration 516B of the keyhole 516. By way of example, the depression(s) 808 in the first configuration 516A shown in FIG. 10A may have a length (L1) greater than a length (L2) of the depression(s) 808 in the second configuration 516B shown in FIG. 10B. Additionally, the depression(s) 808 in the first configuration 516A may have a width (W1) that is less than a width (W2) of the depression(s) 808 in the second configuration 516B. The size of the depression(s) 808 may be complementary in shape to the projections 602 of the key 502 of the shaft 308. That is, the key 502 of the shaft 308 may also vary in size and/or shape depending on the direction of rotation of the motor (e.g., clockwise or counterclockwise). The key 502 may thus be complimentary in shape to either the first configuration 516A or the second configuration 516B of the keyhole 516 to ensure the proper configuration of the hub plate 312 is coupled to the shaft 308.

Based on the above geometry of the first configuration 516A and the second configuration 516B, the hub plate 312 may be error-proofed to minimize or even eliminate improper installation of the hub plate 312. By way of example, the UAV 100 may in certain configurations include the propulsion mechanisms 110. A first portion of the propulsion mechanisms 110 may be coupled to the UAV 100 by hub plates that may be similar to the hub plate 312 and may include the first configuration 516A of the keyhole 516. The first portion of the propulsion mechanisms 110 may be configured for clockwise rotation of their associated blades (e.g., the blades 202). Additionally, a second portion of the propulsion mechanisms 110 may be coupled to the UAV 100 by hub plates that may be similar to the hub plate 312 and may include the second configuration 516B of the keyhole 516. The second portion of the propulsion mechanisms 110 may be configured for counterclockwise rotation of their associated blades (e.g., the blades 202).

As discussed above, sizing of the first keying portion 802 and/or the second keying portion 804 may be different between the first configuration 516A and the second configuration 516B of the keyhole 516. As a result, the hub plates utilized for the first portion of the propulsion mechanisms 110 may be prevented from accidental use with the second portion of the propulsion mechanisms 110, and vice versa. That is, a user may be unable to install (e.g., couple) the first portion of the propulsion mechanisms 110 to the UAV 100 with the hub plates that include the second configuration 516B of the keyhole 516 and also be unable to install (e.g., couple) the second portion of the propulsion mechanisms 110 to the UAV 100 with the hub plates that include the first configuration 516A of the keyhole 516. As such, the error-proofing may ensure proper clockwise rotation of the first portion of the propulsion mechanisms 110 and proper counterclockwise rotation of the second portion of the propulsion mechanisms 110.

Additionally, it should be noted that the error-proofing may further prevent improper orientation of the hub plate 312 during installation. For example, the shelf 806 of the hub plate 312 may facilitate proper engagement with the projections 602 of the key 502. Additionally, the shelf 806 may prevent the user from improperly installing the hub plate 312 upside down such that the shelf 806 does not face the key 502.

Figure 11:
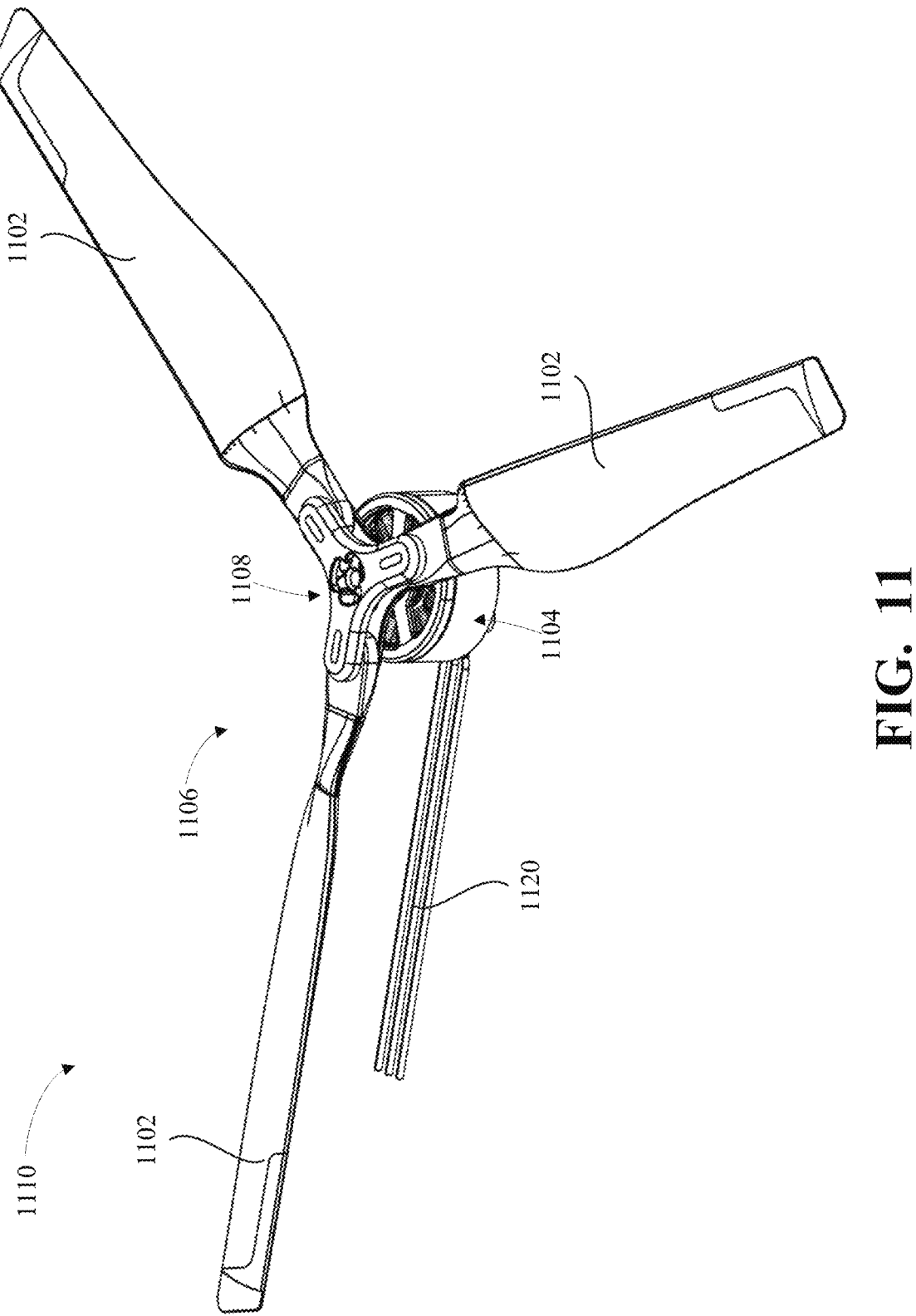
FIG. 11 is a perspective view of another example of a propulsion mechanism for an unmanned aerial vehicle.

FIG. 11 illustrates a perspective view of another example of a propulsion mechanism 1110. As discussed above, the UAV 100 may include one or more propulsion mechanisms, such as the propulsion mechanism 1110 shown in FIG. 11. The propulsion mechanism 1110 may be similar to the propulsion mechanism 110 described above.

As shown in FIG. 11, the propulsion mechanism 1110 may include one or more blades 1102 in communication with a motor 204 of the propulsion mechanism 1110. For example, the propulsion mechanism 1110 may include three of the blades 1102 compared to the propulsion mechanism 110 described above, which may include two of the blades 102. However, the propulsion mechanism 1110 is not limited to any number of the blades 1102, and three of the blades 11102 are shown only for illustrative purposes.

The blades 1102 may be in communication with the motor 1104 via a hub 1106 of the propulsion mechanism 1110 such that the motor 1104 may rotate the blades 1102 to support flight of a UAV, such as the UAV 100. In particular, the hub 1106 may be coupled to the motor 1104 to facilitate communication between the motor 1104 and the blades 1102.

The hub 1106 may include a spring plate assembly 1108. The spring plate assembly 1108 may be similar to the spring plate assembly 208 described above. The spring plate assembly 1108 may be configured to couple the blades 1102 to the hub 1106 so that the motor 1104 may rotate both the hub 1106 and the blades 1102. The hub 1106 may be coupled to a shaft of the motor 1104 (e.g., a shaft similar to the shaft 308 of the motor 204) so that all or a portion of the hub 1106 may be rotated with the blades 1102 by the shaft of the motor 1104 based upon power received by the motor 1104 through wiring 1120 of the motor 1104.

Figure 12A:
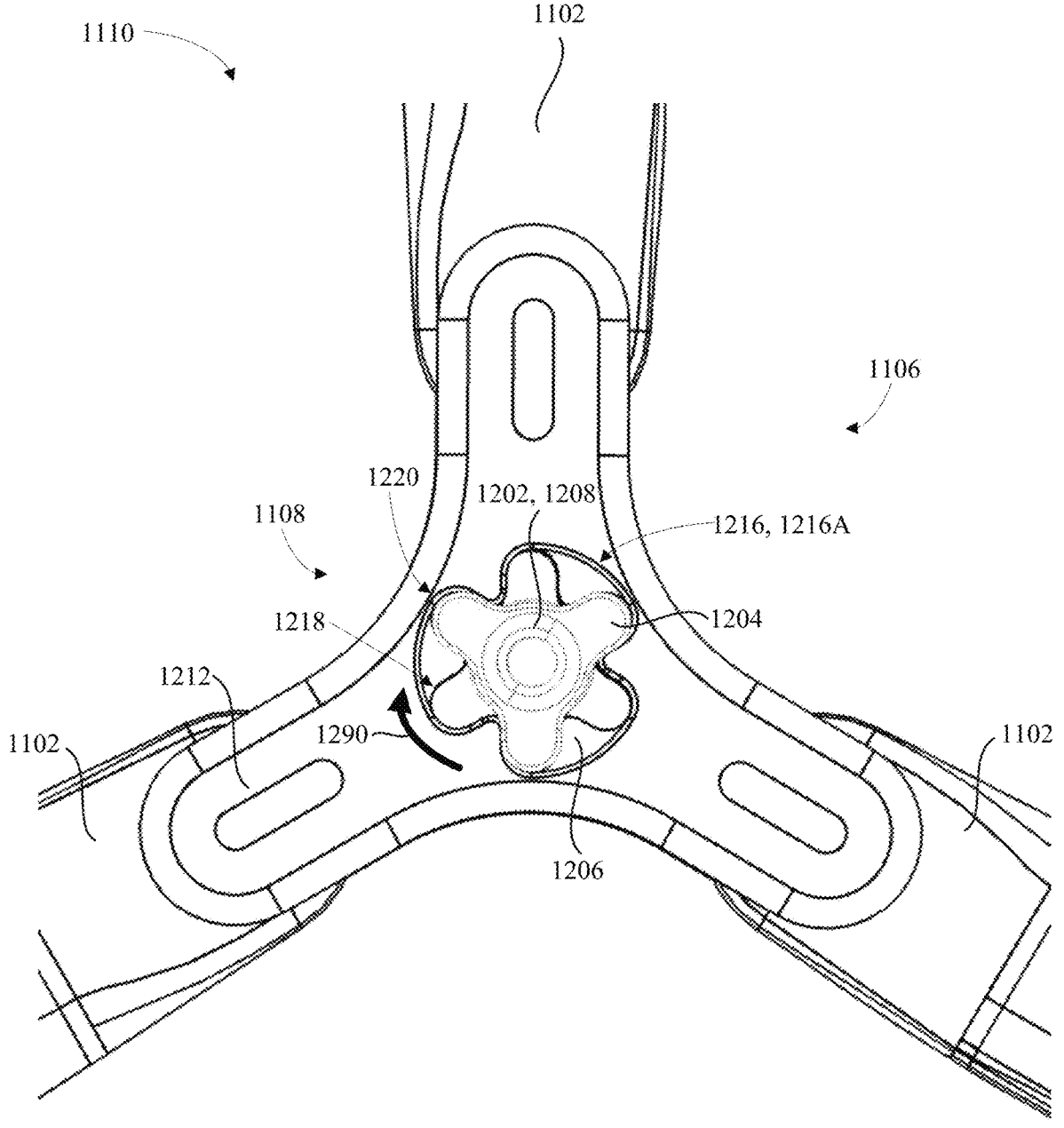
FIG. 12A is a top view of another example of a hub of a propulsion mechanism for an unmanned aerial vehicle rotating in a clockwise direction.
Figure 12B:
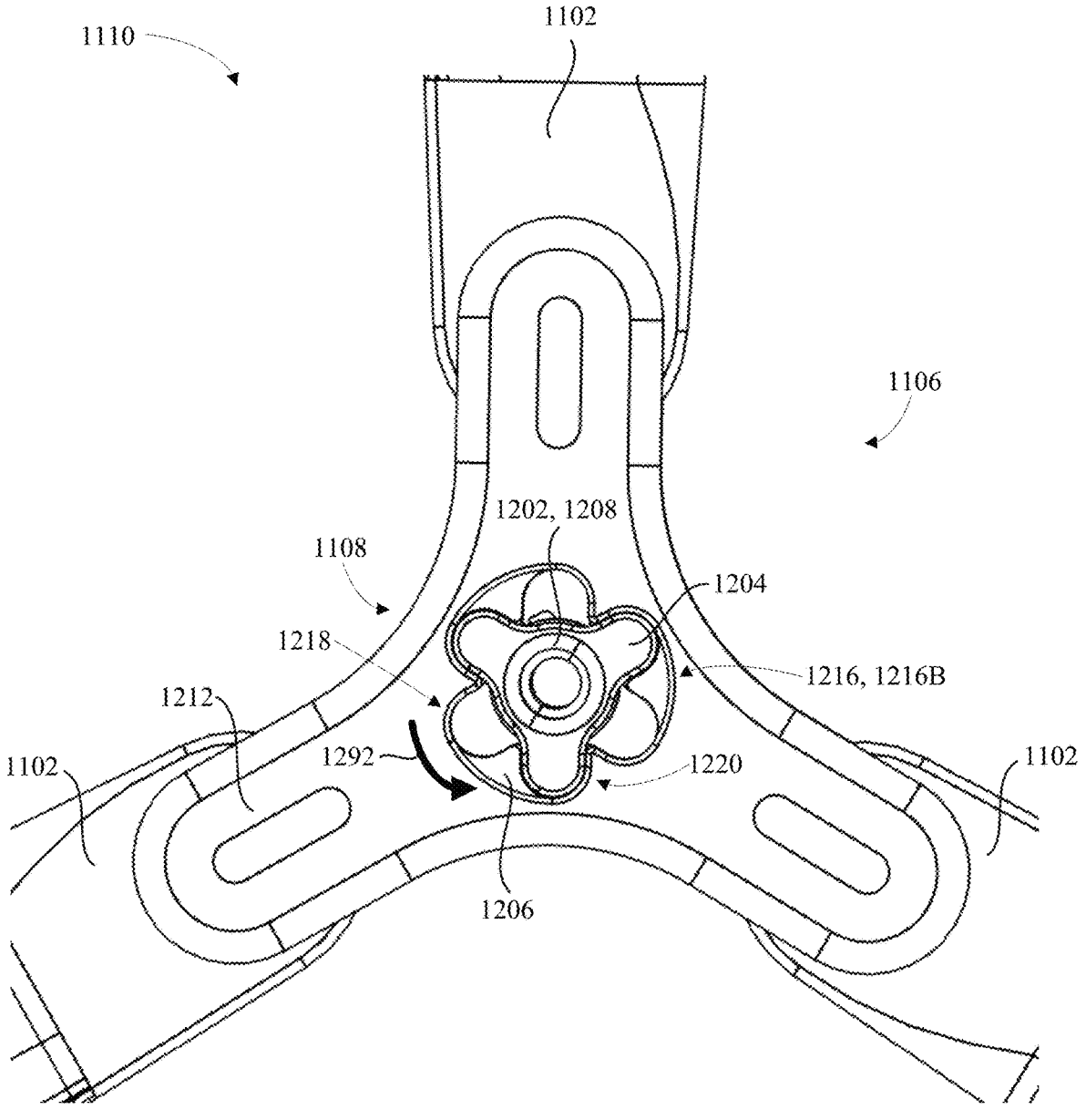
FIG. 12B is a top view of another example of a hub of a propulsion mechanism for an unmanned aerial vehicle rotating in a counterclockwise direction.

FIGS. 12A and 12B illustrate top views of the hub 1106 of the propulsion mechanism 1110 for the UAV 100. As discussed above, the hub 1106 may include a spring plate assembly 1108 that is configured to couple the blades 1102 to a shaft 1208 of the motor 1104. The blades 1102 may be positioned between a pressure plate (e.g., similar to the pressure plate 314) and a hub plate 1212 to secure the blades 1102 during operation. It should be noted that the hub plate 1212 may be similar to the hub plate 312 described above.

The shaft 1208 of the motor 1104 may extend through the pressure plate (e.g., through a keyhole similar to the keyhole 516 of the pressure plate 314 described above) and the hub plate 1212 so that a key 1202 of the shaft 1208 is positioned in a keyhole 1216 of the hub plate 1212. For example, projections 1204 of the key 1202 of the shaft 1208 may extend through a first keying portion 1218 of the keyhole 1216, rotate along a shelf 1206, and be received in a depression (e.g., similar to the depression 808) of a second keying portion 1220 of the keyhole 1216 to secure the shaft 1208 to the spring plate assembly 1108. As discussed above, a biasing member (e.g., similar to the member 310) may facilitate engagement between the key 1202 and the spring plate assembly 1108. Once the shaft 1208 is coupled to the spring plate assembly 1108, rotation of the shaft 1208 may result in rotation of the spring plate assembly 1108, and thus also rotation of the blades 1102.

Similar to the propulsion mechanism 110 described above in FIGS. 9A and 9B, the propulsion mechanism 1110 may be configured to rotate the blades 1102 in a clockwise direction 1290, a counterclockwise direction 1292, or both. FIG. 12A illustrates the propulsion mechanism 1110 rotating the blades 1102 in the clockwise direction 1290 while FIG. 12B illustrates the propulsion mechanism 1110 rotating the blades 1102 in the counterclockwise direction 1292.

As shown in FIG. 12A, to ensure coupling of the shaft 1208 to the spring plate assembly 1108 during rotation of the blades 1102 in the clockwise direction 1290, the hub plate 1212 may include a first configuration 1216A of the keyhole 1216. The first configuration 1216A of the keyhole 1216 may include the shelf 1206 located between the first keying portion 1218 and the second keying portion 1220 so that the projections 1204 of the key 1202 of the shaft 1208 rotate along the shelf 1206 in the clockwise direction 1290 until the projections 1204 are positioned in the depressions of the second keying portion 1220. Advantageously, the projections 1204 may abut a wall or side of the second keying portion 1220 when rotated in the clockwise direction 1290 and positioned in the depressions. As a result, as the shaft 1208 rotates the blades 1102, the projections 1204 may maintain contact with the wall or side of the second keying portion 1220, thereby aiding with driving the spring plate assembly 1108 and the blades 1102 to rotate.

Conversely, as shown in FIG. 12B, to ensure coupling of the shaft 1208 to the spring plate assembly 1108 during rotation of the blades 1102 in the counterclockwise direction 1292, the hub plate 1212 may include a second configuration 1216B of the keyhole 1216. The second configuration 1216B of the keyhole 1216 may include the shelf 1206 located between the first keying portion 1218 and the second keying portion 1220 so that the projections 1204 of the key 1202 of the shaft 1208 rotate along the shelf 1206 in the counterclockwise direction 1292 until the projections 1204 are positioned in the depressions of the second keying portion 1220. The projections 1204 may abut a wall or side of the second keying portion 1220 when rotated in the counterclockwise direction 1292 when in the depressions. As a result, as the shaft 1208 rotates the blades 1102, the projections 1204 may maintain contact with the wall or side of the second keying portion 1220, thereby aiding with driving the spring plate assembly 1108 and the blades 1102 to rotate.

Thus, based on the above, the spring plate assembly 1108 may operate in a similar manner to the spring plate assembly 208 shown in FIGS. 9A and 9B to propel three of the blades 1102 in a clockwise direction and/or a counterclockwise direction.

Figure 13A:
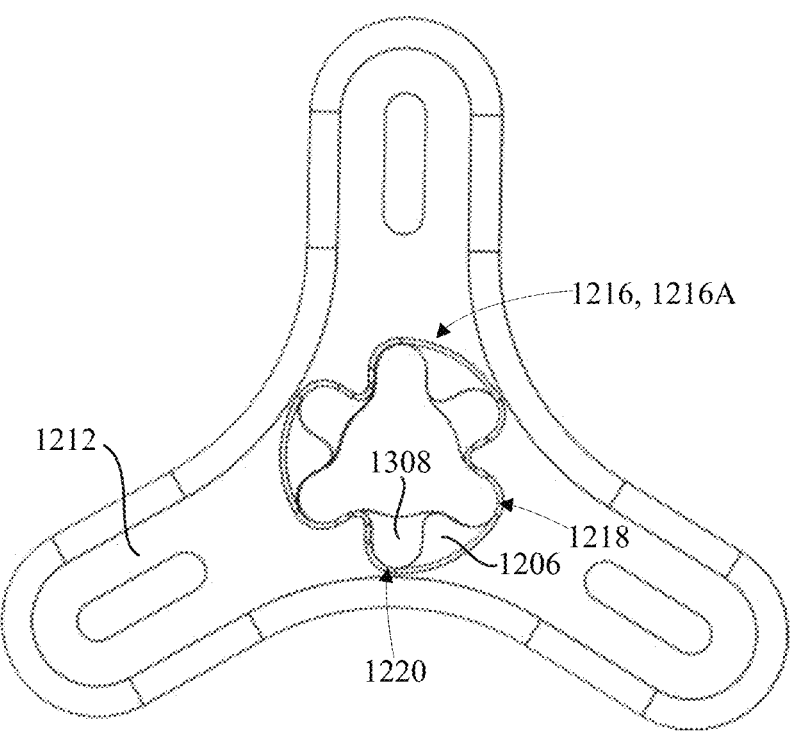
FIG. 13A is a top view of a hub plate of a propeller hub configured for a shaft of a motor rotating in a clockwise direction.
Figure 13B:
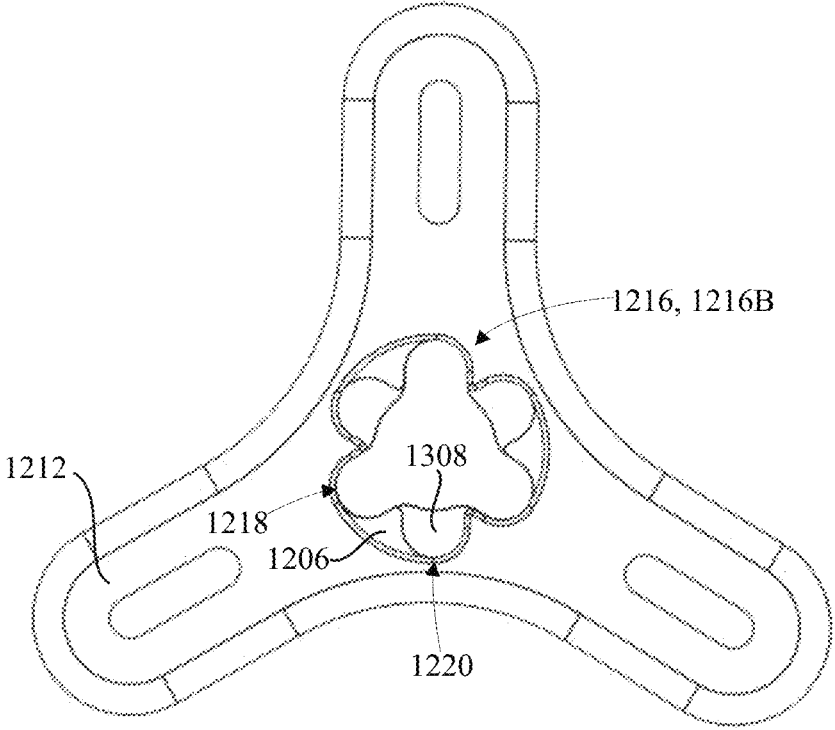
FIG. 13B is a top view of a hub plate of a propeller hub configured for a shaft of a motor rotating in a counterclockwise direction.

FIGS. 13A and 13B illustrate top views of the hub plate 1212. The hub plate 1212 may include the first configuration 1216A of the keyhole 1216, as shown in FIG. 13A, or may include the second configuration 1216B of the keyhole 1216, as shown in FIG. 13B. As discussed above, the first configuration 1216A and the second configuration 1216B may facilitate clockwise rotation and counterclockwise rotation, respectively, of the blades 1102.

As discussed above, the hub plate 1212 may include a first keying portion 1218 and a second keying portion 1210. The first keying portion 1218 may define an opening configured to receive a key (e.g., the key 1202 or the projections 1204 of the key 1202) therethrough. Similarly, the second keying portion 1220 may include depressions 1308 that may receive respective ones of the projections 1204 of the key 1202 to secure the key 1202 to the hub plate 1212 (e.g., based on biasing the hub plate 1212 against the key 1202 via a biasing member similar to the biasing member 310). Additionally, the hub plate 1212 may include the shelf 1206, which may extend between respective ones of the first keying portion 1218 and the second keying portion 1220 to guide the projections 1204 of the key 1202 between the respective ones of the first keying portion 1218 and the second keying portion 1220.

It should be noted that the size and/or shape of the first keying portions 1218 and/or the second keying portions 1220 may vary in size and/or shape to accommodate coupling of the hub plate 1212 to the key 1202. For example, the first keying portions 1218 and/or the second keying portions 1220—including the depressions 1208 thereof—may have a size and/or shape similar to the first keying portions 802 and/or the second keying portion 804 described above with respect to FIGS. 10A and 10B. Thus, the geometry of the hub plate 1212 shown in FIGS. 13A and 13B is for illustrative purposes and not intended to limit the configuration of the hub plate 1212 in any manner.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately) 225°). The term "generally parallel" should thus be understood as referring to encompass configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A propulsion mechanism for an unmanned aerial vehicle (UAV), comprising:
   one or more blades configured for rotation by a motor; and
   a hub configured for coupling to the motor and that includes a spring plate assembly, wherein the spring plate assembly includes:
      a hub plate that includes a mating portion;
      a pressure plate that includes a keyhole that receives the mating portion of the hub plate to couple the hub plate to the pressure plate, wherein the one or more blades are coupled to the hub between the hub plate and the pressure plate; and
      a biasing member configured to be disposed along a shaft of the motor between the motor and the pressure plate, wherein the biasing member is configured to increase friction between the one or more blades and hub plate, and
    wherein the hub plate includes a keyhole that is configured to receive a key of the shaft to releasably couple the shaft to the hub.

2. The propulsion mechanism of claim 1, wherein the hub is configured to be coaxial with an axis of rotation of the shaft such that the hub rotates about the axis of rotation of the shaft based upon rotation of the shaft.

3. The propulsion mechanism of claim 2, wherein the one or more blades are configured to be rotated by the shaft of the motor based upon rotation of the hub.

4. The propulsion mechanism of claim 1, wherein the hub plate includes one or more bosses received by apertures within the one or more blades to couple the one or more blades to the hub.

5. The propulsion mechanism of claim 4, wherein one or more fasteners extend through the pressure plate and are received by the one or more bosses of the hub plate.

6. The propulsion mechanism of claim 1, wherein the hub is configured to couple to the shaft of the motor and configured to be rotated with the one or more blades by the shaft of the motor.

7. A propulsion mechanism for an unmanned aerial vehicle (UAV), comprising:
   one or more blades configured for rotation by a motor; and
   a hub configured for coupling to the motor and that includes a spring plate assembly, wherein the spring plate assembly includes:

a hub plate that includes one or more bosses received by apertures within the one or more blades to couple the one or more blades to the hub;
      a pressure plate that defines a keyhole that receives a mating portion of the hub plate to couple the hub plate to the pressure plate, wherein the one or more blades are located between the hub plate and the pressure plate; and
      a biasing member disposed between the motor and the pressure plate.

8. The propulsion mechanism of claim 7, wherein the biasing member is configured to increase friction between the one or more blades and the hub plate.

9. The propulsion mechanism of claim 7, wherein the biasing member is configured to bias the one or more blades away from a motor of the propulsion mechanism.

10. The propulsion mechanism of claim 7, wherein the one or more bosses and the mating portion extend from a surface of the hub plate in a direction towards the pressure plate.

11. The propulsion mechanism of claim 7, wherein the biasing member is configured for positioning around a shaft of the motor so that the biasing member is compressed between the motor and the pressure plate.

12. The propulsion mechanism of claim 11, wherein a first end of the biasing member is positioned in a groove of the pressure plate that at least partially surrounds the keyhole of the pressure plate.

13. The propulsion mechanism of claim 11, wherein the hub plate defines a keyhole that is configured to receive a key of a shaft of the motor to releasably couple the shaft to the hub.

14. A propulsion mechanism for an unmanned aerial vehicle (UAV), comprising:
   one or more blades; and
   a hub configured for coupling to a motor of the propulsion mechanism and that includes a spring plate assembly, wherein the spring plate assembly includes:
      a hub plate that includes a mating portion and that defines a keyhole, wherein the keyhole is configured to receive a key of a shaft of the motor to releasably couple the shaft to the hub; and
      a pressure plate that receives the mating portion of the hub plate to couple the hub plate to the pressure plate.

15. The propulsion mechanism of claim 14, wherein the spring plate assembly further comprises a biasing member that is configured to be disposed along the shaft of the motor.

16. The propulsion mechanism of claim 15, wherein the biasing member is located between the motor and the pressure plate.

17. The propulsion mechanism of claim 14, wherein the hub plate includes one or more bosses received by apertures defined by the one or more blades.

18. The propulsion mechanism of claim 14, wherein the keyhole of the hub plate includes a first keying portion and a second keying portion positioned transverse to the first keying portion, and wherein the key of the shaft is configured to extend through the first keying portion and then rotate with respect to the first keying portion so that the key is received by the second keying portion.

19. The propulsion mechanism of claim 18, wherein the first keying portion and the second keying portion are complementary in shape to the key of the shaft.

20. The propulsion mechanism of claim 18, wherein the second keying portion includes a depression, and a projection of the key of the shaft is configured for positioning in the depression to couple the hub to the shaft.

\* \* \* \* \*